(12) United States Patent
Yang et al.

(10) Patent No.: US 10,048,648 B2
(45) Date of Patent: Aug. 14, 2018

(54) OPTICAL DEVICE FOR REPRODUCING THREE-DIMENSIONAL LIGHTING IMAGES

(71) Applicants: Hyundai Motor Company, Seoul (KR); SL Corporation, Daegu (KR)

(72) Inventors: Jeong Gyu Yang, Yongin (KR); Sun Tae Kim, Gwangju (KR)

(73) Assignees: HYUNDAI MOTOR COMPANY, Seoul (KR); SL CORPORATION, Daegu (KR)

( * ) Notice: Subject to any disclaimer, the term of this patent is extended or adjusted under 35 U.S.C. 154(b) by 13 days.

(21) Appl. No.: 14/933,890

(22) Filed: Nov. 5, 2015

(65) Prior Publication Data

US 2016/0161913 A1 Jun. 9, 2016

(30) Foreign Application Priority Data

Dec. 8, 2014 (KR) ........................ 10-2014-0174865

(51) Int. Cl.
*G03H 1/02* (2006.01)
*G03H 1/22* (2006.01)
(Continued)

(52) U.S. Cl.
CPC ............ *G03H 1/2286* (2013.01); *F21S 43/14* (2018.01); *F21S 43/26* (2018.01); *F21S 43/31* (2018.01);
(Continued)

(58) Field of Classification Search
CPC ...... G03H 1/2286; G03H 1/2202; G03H 1/02; G03H 2001/2226; G03H 2227/06; G03H 2001/0413; G03H 2001/0415; G03H 2001/2239; G03H 2227/02; G03H 2227/05; G03H 2001/0224; G03H 2001/026; G03H 2001/0264; G03H 2001/0268; G03H 2001/186; G03H 2001/263; G03H 2001/043; G03H 2240/25; G03H 2270/21; G03H 1/0005; G03H 2001/0077; G03H 2001/0439; G03H 1/0406; G03H 1/2205;
(Continued)

(56) References Cited

U.S. PATENT DOCUMENTS 3,767,288 A * 10/1973 Gross ................... F21S 48/1131
359/488.01
5,293,259 A 3/1994 Huang et al.
(Continued)

FOREIGN PATENT DOCUMENTS

JP 09-039653 A 2/1997
JP 10-83707 A 3/1998
(Continued)

*Primary Examiner* — Jade R Chwasz
(74) *Attorney, Agent, or Firm* — McDermott Will & Emery LLP (57) ABSTRACT

An optical device includes a hologram recording member on which a hologram image is recorded, a light source for reproducing the hologram image, a first reflecting surface for projecting the hologram image ahead of the hologram recording member by reflecting a light from the light source into a rear side of the hologram recording member at a predetermined angle, and a second reflecting surface for generating a backlight by reflecting the light from the light source into the rear side of the hologram recording member.

19 Claims, 4 Drawing Sheets

(51) Int. Cl.
   *F21V 7/00* (2006.01)
   *F21S 43/14* (2018.01)
   *F21S 43/20* (2018.01)
   *F21S 43/31* (2018.01)
   *F21S 43/40* (2018.01)
   *G03H 1/04* (2006.01)

(52) U.S. Cl.
   CPC ............ *F21S 43/40* (2018.01); *F21V 7/0008* (2013.01); *F21V 7/0033* (2013.01); *F21V 7/0066* (2013.01); *G03H 1/2202* (2013.01); *G03H 2001/0413* (2013.01); *G03H 2001/2234* (2013.01); *G03H 2210/30* (2013.01); *G03H 2227/06* (2013.01)

(58) Field of Classification Search
   CPC ... G03H 2001/0432; G03H 2001/2207; G03H 2001/2228; G03H 2001/2231; G03H 2001/2289; G03H 2001/2234; G03H 2210/30; G11B 7/0065; G11B 7/24044; G02B 2027/0181; G02B 2027/0183; G02B 27/0103; F21S 43/40; F21S 43/14; F21S 43/31; F21S 43/26; F21V 7/0008; F21V 7/0033; F21V 7/0066
   USPC ........................................ 359/3, 13–15, 32
   See application file for complete search history.

(56) References Cited

U.S. PATENT DOCUMENTS 5,708,519 A * 1/1998 Yamamoto ............. B60Q 1/302
                                                              340/479
2010/0214797 A1   8/2010 Wang et al.
2010/0302794 A1  12/2010 Oomen et al.

FOREIGN PATENT DOCUMENTS

| | | |
|---|---|---|
| JP | H10-95247 A | 4/1998 |
| JP | 10-223006 A | 8/1998 |
| JP | H11-170910 A | 6/1999 |
| JP | 3262200 B2 | 12/2001 |
| KR | 10-1998-0037470 A | 8/1998 |

* cited by examiner

[ REPRODUCTION OF HOLOGRAM IMAGE -FIRST REFLECTING SURFACE ]

FIG.1

[ BACKLIGHT-SECOND REFLECTING SURFACE ]

OPTICAL DEVICE FOR REPRODUCING THREE-DIMENSIONAL LIGHTING IMAGES

CROSS-REFERENCE TO RELATED APPLICATION

This application claims under 35 U.S.C. § 119(a) the benefit of Korean Patent Application No. 10-2014-0174865, filed on Dec. 8, 2014 with the Korean Intellectual Property Office, the entire contents of which are incorporated herein by reference.

TECHNICAL FIELD

The present disclosure relates to a device for reproducing a lighting image. More particularly, the present disclosure relates to an optical device for reproducing various three-dimensional (3D) lighting images.

BACKGROUND

In the optical technology used for automotive lamps, a type of realizing lighting image using the direct light from an LED light source and a surface emission using a light guide and a diffusion film are employed. Further, 3D lenses having complicated shapes are also used to achieve 3D images.

However, the optical technology using direct light from an LED light source or indirect reflection includes the following problems:

1. There is a limit when creating an image using a lamp.

As images are made by arranging LEDs and combining reflecting surfaces and inner lenses, lighting images are often realized by a linear combination of LEDs and thus, only two-dimensional (2D) lighting images can be represented.

2. Using a plurality of LEDs and inner lenses to realize various types of images requires complicated components and combinations thereof.

As images are made by arranging a plurality of LEDs, inner lenses and reflecting surfaces (light guides), the number of required components is large and a plurality of complicated inner lenses are often used to achieve 3D images.

3. Using a plurality of LEDs and inner lenses increases manufacturing costs.

LEDs are relatively expensive light sources. Accordingly, when used as a light source, the manufacturing cost of such a lamp increases.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to solve the above-described problems associated with prior art.

The present disclosure is to provide an optical device for reproducing various configurations of 3D lighting images by using a single light source and a hologram recording member.

In one aspect, the present disclosure provides an optical device for reproducing three-dimensional lighting image, comprising: a hologram recording member on which a hologram image is recorded; a light source for reproducing the hologram image of the hologram recording member; a first reflecting surface projecting the hologram image ahead of the hologram recording member by reflecting light from the light source to the rear side of the hologram recording member at a predetermined angle; and a second reflecting surface generating backlight by allowing the light of the light source to enter into the rear side of the hologram recording member.

The light source may be a single light source composed of one light source member.

The first reflecting surface may be a plate-shaped light reflector, wherein when the first reflecting surface reflects the light from the light source and allows the light to enter into the hologram recording member, the first reflecting surface allows the light of the light source to enter into the rear side of the hologram recording member at an incident angle within a predetermined range that is the same as the range of an incident angle of a reference beam irradiated when the hologram image is recorded on the hologram recording member.

Preferably, when the first reflecting surface reflects the light from the light source and allows the light to enter into the hologram recording member, the first reflecting surface allows the light of the light source to enter the rear side of the hologram recording member at an incident angle that is the same as an incident angle of a reference beam irradiated when the hologram image is recorded on the hologram recording member.

The second reflecting surface may be a curvilinear light reflector, and may be disposed behind the hologram recording member with one end disposed at the rear end of the first reflecting surface and the other end disposed behind the light source. The second reflecting surface may allow the light of the light source to enter into the hologram recording member at an incident angle different from that of the light from the light source entering into the hologram recording member via the first reflecting surface.

According to an embodiment of the present disclosure, the optical device may further comprise an additional reflecting surface for reflecting the light from the light source to the second reflecting surface in order to increase backlight efficiency.

The additional reflecting surface may be a plate-shaped light reflector, may be disposed ahead of the light source at a lower rear side of the hologram recording member and a lower side of the first reflecting surface, and may be configured to allow the light from the light source to enter into the rear side of the hologram recording member via the second reflecting surface. Further, the light entering into the hologram recording member may have an incident angle different from that of the light from the light source, which enters into the rear side of the hologram recording member via the first reflecting surface.

According to another embodiment of the present disclosure, the second reflecting surface may be composed of a top reflecting part and a bottom reflecting part over and under a base at the middle portion, respectively, wherein the top reflecting part may be disposed behind an upper inner lens outside and over the hologram recording member and the bottom reflecting part may be disposed behind a lower inner lens outside and under the hologram recording member.

The upper inner lens may produce backlight by transmitting light of the light source reflected by the top reflecting part and the lower inner lens may produce backlight by transmitting light of the light source reflected by the bottom reflecting part.

The optical device according to the present disclosure, which may be a high-efficiency optical structure that reproduces a hologram image and produces backlight using one light source, can realize a 3D lighting image by using a single light source and has an advantageous effect of reducing the manufacturing cost and an associated weight through simplification of the optical structure.

Other aspects and preferred embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Hereinafter, the present disclosure will be described for those skilled in the art to easily achieve it.

The optical device according to the present disclosure has an optical structure that creates a hologram image with a single light source and achieves backlight using additional direct light.

Figure 1:
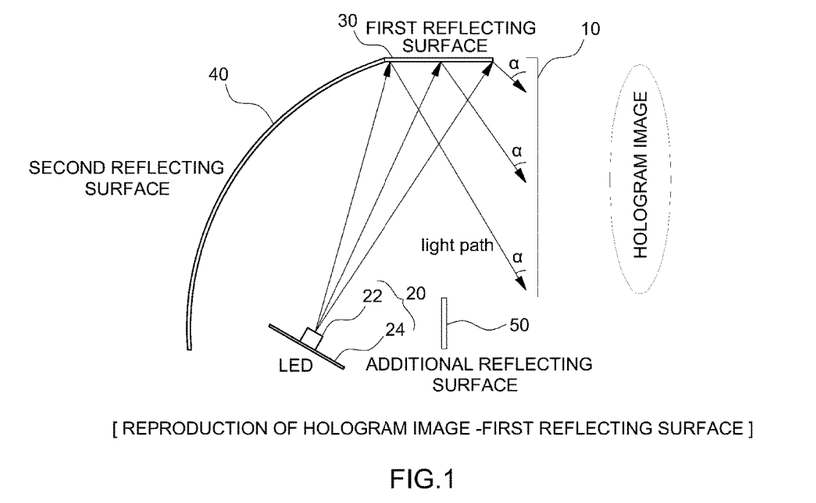
FIGS. 1 and 2 illustrate an optical device according to an embodiment of the present disclosure.
Figure 2:
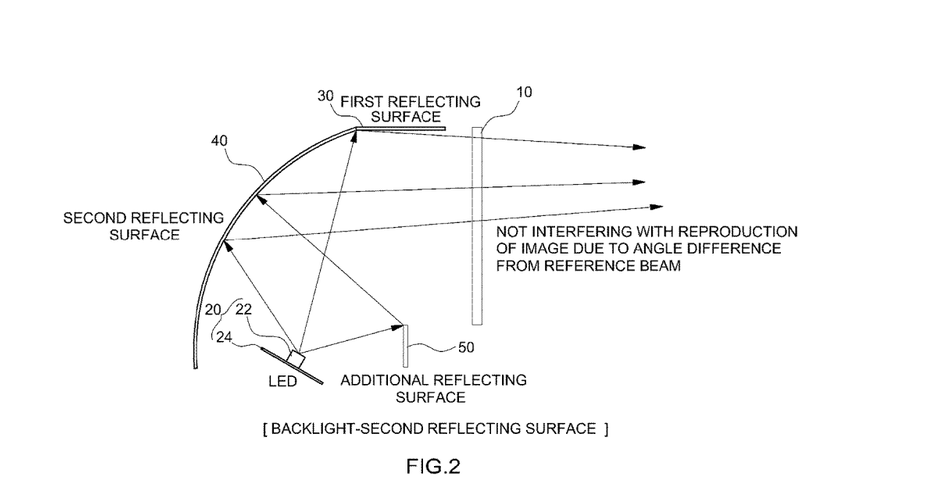

Referring to FIGS. 1 and 2, the optical device according to an embodiment of the present disclosure uses a thin film type hologram recording member 10, on which a predetermined hologram image is recorded, and a light source 20 for reproducing the hologram image of the hologram recording member 10.

The hologram recording member 10 has light transmission properties, wherein when it receives reference beams having an incident angle within a range that may be the same as that used when the hologram image was recorded, it transmits the reference beam forward and reproduces a hologram image in front of the hologram recording member 10.

The light source 20, which may be a single light source including one light source member 22, is disposed below and behind the hologram recording member 10 and configured in the form of one LED mounted singly on a circuit board 24.

The light source 20 may be configured to irradiate light to predetermined positions in predetermined directions so that light irradiated from the light source 20 can enter into the hologram recording member 10 at a predetermined incident angle via a first reflecting surface 30.

The first reflecting surface 30 and a second reflecting surface 40 may be used to form the reference beam and backlight which are irradiated to, and enter into, the hologram recording member 10, from one light source 20.

The first reflecting surface 30, which may be provided to project a hologram image ahead of the hologram recording member 10 by allowing light (reference beam) from the light source 20 to enter into the hologram recording member 10 at a predetermined angle, may be disposed at a predetermined distance above and behind the hologram recording member 10. For example, the first reflecting surface 30 may be disposed perpendicular to (or at an angle to) the hologram recording member 10. In an embodiment, a plate-shaped light reflector may be used for the first reflecting surface 30.

As described above, in order for a hologram image to be reproduced, the light from the light source 20 may be required to enter into the hologram recording member 10 at an incident angle within a predetermined range that is the same as that used when a hologram image is recorded on the hologram recording member 10.

To this end, the first reflecting surface 30 is configured to allow the light from the light source 20 to enter into the hologram recording member 10 at an incident angle within a predetermined range that is the same as the incident angle of the reference beam that entered into the hologram recording member 10 when a hologram image is recorded on the hologram recording member 10.

Accordingly, the reference beam that is reflected from the first reflecting surface 30 and enters into the hologram recording member 10 has an incident angle within a predetermined range that is the same as that of the reference beam irradiated to the hologram recording member 10 when a hologram image was recorded. The light from the light source 20 reflects from the first reflecting surface 30 and enters into the hologram recording member 10 at an incident angel within a predetermined range that is the same as the default incident angle (an incident angle that is the same as that used when a hologram image was recorded on the hologram recording member 10), so the hologram image recorded on the hologram recording member 10 can be reproduced.

In detail, when the first reflecting surface 30 reflects the light from a light source 20 and allows the light to enter into the hologram recording member 10, it allows the light from the light source to enter into the rear side of the hologram recording member 10 at an incident angle within the same range as the range of incident angles of the reference beam that has been irradiated to record a hologram image on the hologram recording member 10.

In particular, a reference beam having an incident angle of 30~60° may be used to record a hologram image on the hologram recording member 10, and similarly, a reference beam having an incident angle of 30~60° may also be used to reproduce the hologram image of the hologram recording member 10.

Preferably, the reference beam that is reflected from the first reflecting surface 30 and enters into the hologram recording member 10 may have the same incident angle as the reference beam that was irradiated to the hologram recording member 10 when a hologram image was recorded.

The second reflecting surface 40, which is provided for supplying backlight by reflecting the light from the light source 20 to the hologram recording member 10, may be disposed behind the hologram recording member 10 with one end disposed at the rear end of the first reflecting surface 30 and the other end disposed behind the light source 20. The second reflecting surface 40 may be configured to allow the light from the light source 20 to enter into the hologram recording member 10 at an incident angle different from that of the reference beam irradiated to the hologram recording member 10 via the first reflecting surface 30, so the light does not interfere with reproducing a hologram image.

For example, the second reflecting surface 40 may be an arc shaped light reflector having a predetermined curvature and may be integrally formed at the rear end of the first reflecting surface 30.

Figure 3:
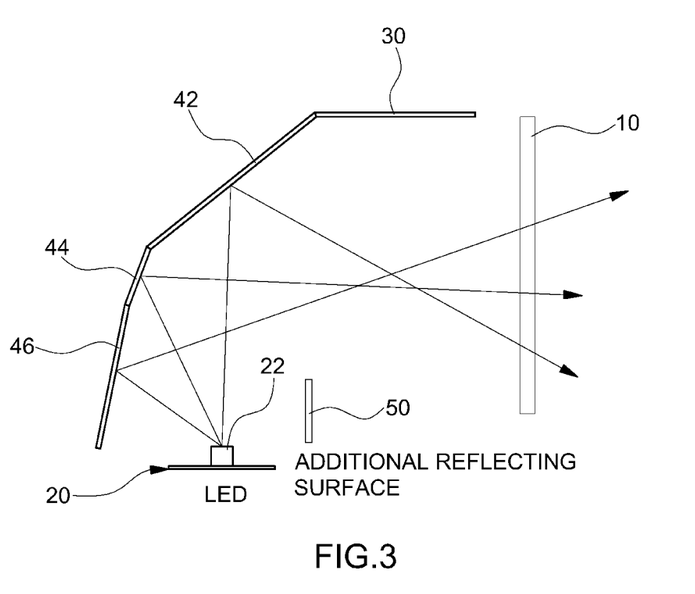
FIG. 3 is a view an illustration of the structure of reflecting surfaces available for the optical device of the present disclosure.

Further, as shown in FIG. 3, the second reflecting surface 40 may be divided into a plurality of reflecting portions 42, 44 and 46 in accordance with the backlight areas, wherein each of the reflecting portions 42, 44 and 46 may have a predetermined shape in accordance with the backlight area. For example, in the reflecting portions of the second reflecting surface 40, the first reflecting portion 42 may be configured to reflect light to 0U~15D area, whereas the second reflecting portion 44 and the third reflecting portion 46 may be configured to reflect light to 0U~15U area.

Further, in order to increase backlight efficiency, an additional reflecting surface 50 for reflecting the light from the light source 20 to the second reflecting surface 40 may be disposed below and behind the hologram recording member 10.

The additional reflecting surface 50 may be disposed ahead of the light source 20 to increase the efficiency of the light irradiated from the light source 20 and may be configured to allow the entered light from the light source 20 to enter into the hologram recording member 10 via the second reflecting surface 40. The light entering into the hologram recording member 10 may have an incident angle different from that of the reference beam entering into the hologram recording member 10 via the first reflecting surface 30 in order to reproduce an hologram image.

The additional reflecting surface 50 may be disposed ahead of the light source 20 and between the front lower side of the second reflecting surface 40 and the rear lower side of the hologram recording member 10 under the first reflecting surface 30.

The light source 20 may be disposed between the front lower side of the second reflecting surface 40 and the rear lower side of the hologram recording member 10 behind the additional reflecting surface 50.

The additional reflecting surface 50 may be a plate-shaped light reflector perpendicular to (at an angle to) the first reflecting surface 30 and the inclination of the additional reflecting surface 50 can be changed, if necessary.

Figure 4:
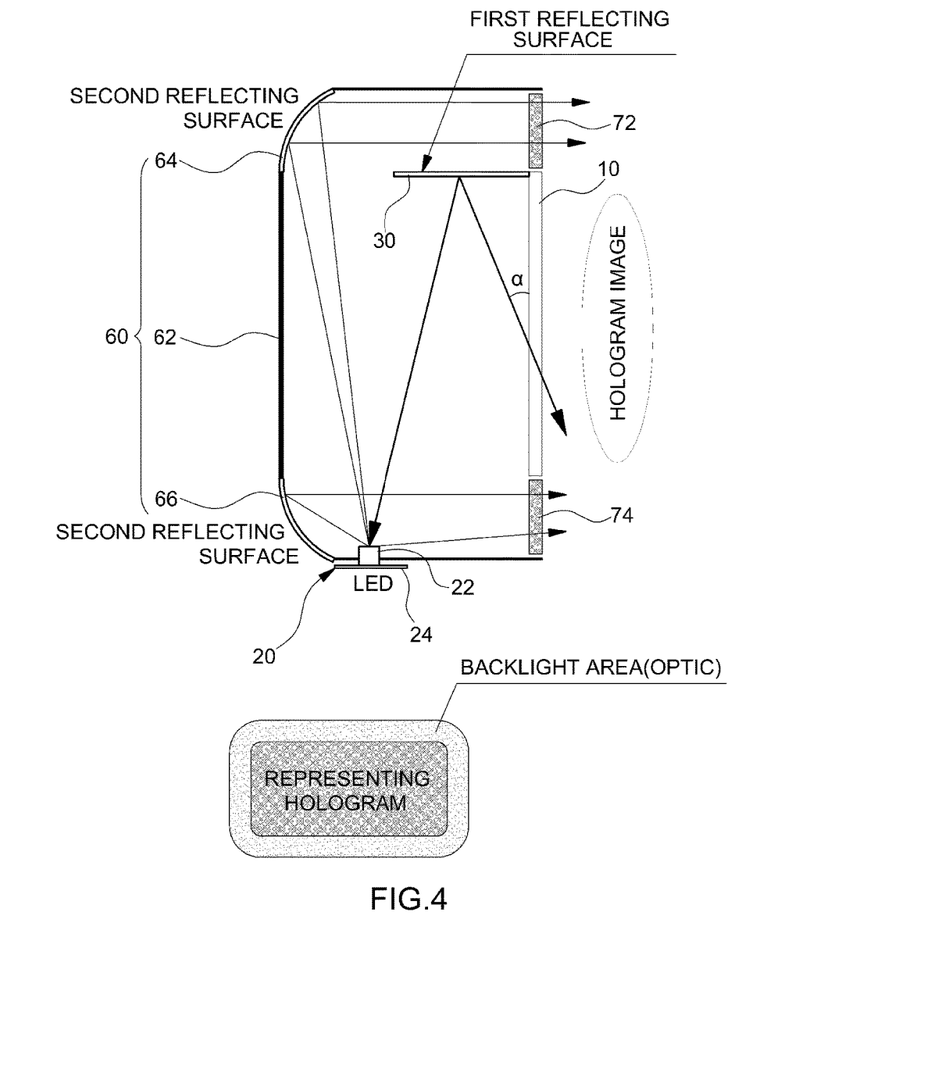
FIG. 4 is a diagram illustrating an optical device according to another embodiment of the present disclosure.

FIG. 4 shows an optical device according to another embodiment of the present disclosure.

Referring to FIG. 4, similar to the optical device of the previous embodiment, a first reflecting surface 30 may be disposed at a right angle (or at an angle) at the rear upper side of a hologram recording member 10 on which a predetermined hologram image is recoded. A second reflecting surface 60 may be disposed at a predetermined distance from the first reflecting surface 30 behind the hologram recording member 10.

The second reflecting surface 60 may be composed of a top reflecting part 64 and a bottom reflecting part 66 over and under a base 62 at the middle portion, respectively. The top reflecting part 64 may be disposed behind an upper inner lens 72 outside and over the hologram recording member 10 and the bottom reflecting part 66 may be disposed behind a lower inner lens 74 outside and under the hologram recording member 10.

The upper inner lens 72 and the lower inner lens 74 may be a portion of a single inner lens surrounding the hologram recording member 10.

The top reflecting part 64 and the bottom reflecting part 66 of the second reflecting surface 60 may be formed to reflect the light from the light source 20 to the upper inner lens 72 and the lower inner lens 74, respectively. For example, they may be arc-shaped light reflectors having a predetermined curvature or curvilinear light reflectors having different curvatures for predetermined sections.

The inner lenses 72 and 74 may make backlight by transmitting the light of the light source 20 reflected by the second reflecting surface 60 and entered therein and emitting the light forward.

As the inner lenses 72 and 74 are disposed ahead of the second reflecting surface 60 and outside the hologram recording member 10, they satisfy backlight requirements under the related rules and external appearance.

The optical device reproduces a hologram image with light irradiated toward one or more directions from one light source 20 by using the first reflecting surface 30 and satisfies backlight requirements under the related rules by reflecting the light irradiated toward the other directions using the second reflecting surface 40 or 60.

The optical device reproduces a hologram image ahead of the hologram recording member 10 as the light (reference beam) of the light source 20 reflects from the first reflecting surface 30, enters into the hologram recording member 10, transmits the hologram recording member 10 and forms backlight with the light of the light source 20 reflected by the second reflecting surface 40 or 60. Accordingly, backlight requirements under the related rules are satisfied.

The optical device is available for automotive rear lamps, and lamps equipped with the optical device can not only satisfy backlight requirements under the related rules but also realize 3D lighting images, unlike other existing lamps.

The present disclosure uses a transmissive hologram type in which an image projected through the hologram recording member 10 can be seen from the front of the hologram recording member 10 by irradiating light from behind the hologram recording member 10 in consideration of the features of automotive lamps.

A general principle of recording and reproducing a hologram image is now described with reference to FIG. 5.

As known in the art, a hologram image is obtained by recording reference light from a laser (light source) and an object light from an object on a hologram recording member in interference fringes. In order to reproduce such hologram image, it is required to irradiate to a hologram recording member reference light (reference beam) having an incident angle within a predetermined range that is the same as that used when an image is recorded.

Figure 5:
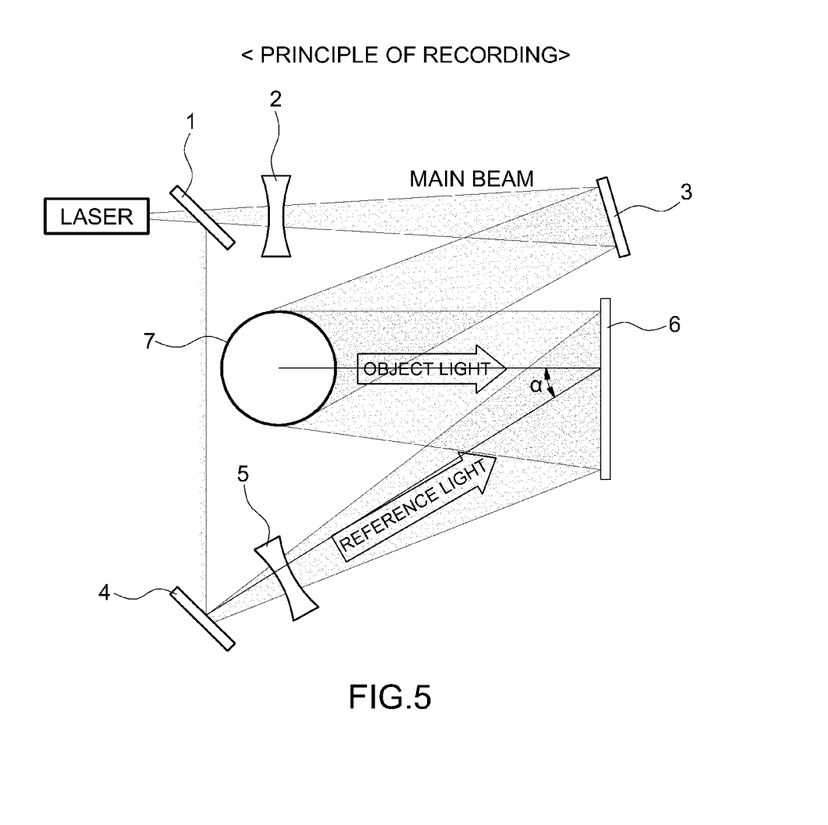
FIG. 5 is a view illustrating a general principle of recording a hologram image.

Referring to FIG. 5, when a hologram image is recorded on a hologram recording member 6, a laser beam is divided into a main beam and a reference beam through a half mirror 1, wherein the main beam reflects from a mirror 3 and is irradiated to an object after passing through a lens 2. The reference beam reflects from a mirror 4 and enters into the hologram recording member 6 at a predetermined incident angle α through a lens 5. At this time, interference fringes made by the main beam (object light) scattered from the object 7 and the reference beam is recorded on the hologram recording member 6.

Further, when a hologram image is reproduced from the hologram recording member 6, a 3D image is reproduced in the space ahead of the hologram recording member 6 by simply irradiating a reference beam to the hologram recording member 6 at an incident angle α within a predetermined range that is the same as the reference beam used for recording the hologram image.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. An optical device for reproducing a three dimensional lighting image, comprising:
   a hologram recording member on which a hologram image is recorded;
   a light source for reproducing the hologram image;
   a first reflecting surface for projecting the hologram image ahead of the hologram recording member by reflecting a light from the light source to a rear side of the hologram recording member at a predetermined angle;
   a second reflecting surface for generating a backlight by reflecting the light from the light source into the rear side of the hologram recording member, and
   an additional reflecting surface for reflecting the light of the light source to the second reflecting surface,
   wherein the additional reflecting surface is disposed between the light source and the hologram recording member at a lower side of the first reflecting surface such that the additional reflecting surface reflects the light of the light source to the second reflecting surface, a portion of which is disposed at a rear side of the light source.

2. The optical device of claim 1, wherein when the first reflecting surface reflects the light from the light source and allows the light from the light source to enter the hologram recording member, the first reflecting surface allows the light from the light source reflected by the first reflecting surface to enter the rear side of the hologram recording member at an incident angle within a predetermined range that is the same as that used when the hologram image is recorded on the hologram recording member.

3. The optical device of claim 1, wherein when the first reflecting surface reflects the light from the light source and allows the light from the light source to enter the hologram recording member, the first reflecting surface allows the light from the light source reflected by the first reflecting surface to enter the rear side of the hologram recording member at an incident angle that is the same as an incident angle of a reference beam irradiated when the hologram image is recorded on the hologram recording member.

4. The optical device of claim 1, wherein the light from the light source reflected by the second reflecting surface enters the hologram recording member at an incident angle different from that of the light from the light source reflected by the first reflecting surface.

5. The optical device of claim 4, wherein the second reflecting surface is a curvilinear light reflector and is disposed behind the hologram recording member, where the second reflecting surface includes one end disposed at the rear end of the first reflecting surface and a second end disposed behind the light source.

6. The optical device of claim 1, wherein the second reflecting surface is a curvilinear light reflector and is disposed behind the hologram recording member, where the second reflecting surface includes one end disposed at a rear end of the first reflecting surface and a second end disposed behind the light source.

7. The optical device of claim 1, wherein the additional reflecting surface is a plate-shaped light reflector and is disposed ahead of the light source at a lower rear side of the hologram recording member and at a lower side of the first reflecting surface.

8. The optical device of claim 7, wherein the additional reflecting surface is configured to allow light from the light source reflected by the additional reflecting surface to enter into the rear side of the hologram recording member via the second reflecting surface, wherein the light from the light source reflected by the additional reflecting surface entering into the rear side of the hologram recording member has an incident angle different from that of the light from the light source reflected by the first reflecting surface entering into the rear side of the hologram recording member.

9. The optical device of claim 1, wherein the additional reflecting surface is configured to allow light from the light source reflected by the additional reflecting surface to enter into the rear side of the hologram recording member via the second reflecting surface, wherein the light from the light source reflected by the additional reflecting surface entering into the rear side of the hologram recording member has an incident angle different from that of the light from the light source reflected by the first reflecting surface entering into the rear side of the hologram recording member.

10. The optical device of claim 1, wherein the light source is a single light source composed of one light source member.

11. The optical device of claim 1, wherein the second reflecting surface is composed of a top reflecting part and a bottom reflecting part disposed over and under a base at a middle portion, respectively, and
   wherein the top reflecting part is disposed behind an upper inner lens outside and over the hologram recording member and the bottom reflecting part is disposed behind a lower inner lens outside and under the hologram recording member.

12. The optical device of claim 11, wherein the upper inner lens produces backlight by transmitting light from the light source reflected by the top reflecting part and traveling through the upper inner lens and the lower inner lens produces backlight by transmitting light from the light source reflected by the bottom reflecting part and traveling through the upper inner lens.

13. An optical device for reproducing a three dimensional lighting image, comprising:
   a hologram recording member on which a hologram image is recorded;
   a light source for reproducing the hologram image;
   a first reflecting surface for projecting the hologram image ahead of the hologram recording member by reflecting a light from the light source to a rear side of the hologram recording member at a predetermined angle; and
   a second reflecting surface for generating a backlight by reflecting the light from the light source into the rear side of the hologram recording member,
   wherein the second reflecting surface is disposed at a predetermined distance from the first reflecting surface behind the hologram recording member,
   wherein the second reflecting surface is composed of a top reflecting part and a bottom reflecting part disposed over and under a base at a middle portion, respectively,
   wherein the top reflecting part is disposed behind an upper inner lens outside and over the hologram recording member and the bottom reflecting part is disposed behind a lower inner lens outside and under the hologram recording member, and
   wherein the upper inner lens and the lower inner lens are a portion of a single inner lens surrounding the hologram recording member.

14. The optical device of claim 13, wherein the top reflecting part and the bottom reflecting part of the second reflecting surface are formed to reflect light from the light source to the upper inner lens and the lower inner lens, respectively.

15. The optical device of claim 13, wherein the top reflecting part and the bottom reflecting part of the second reflecting surface are arc-shaped light reflectors having a predetermined curvature or curvilinear light reflectors having different curvatures for predetermined sections.

16. An optical device for reproducing a three dimensional lighting image, comprising:
   a hologram recording member on which a hologram image is recorded;
   a light source for reproducing the hologram image;
   a first reflecting surface for projecting the hologram image ahead of the hologram recording member by reflecting a light from the light source to a rear side of the hologram recording member at a predetermined angle;
   a second reflecting surface for generating a backlight by reflecting the light from the light source into the rear side of the hologram recording member, and
   an additional reflecting surface, which is a separate reflecting surface from the first and second reflecting surfaces,
   wherein the additional reflecting surface is disposed between the light source and the hologram recording member at a lower side of the first reflecting surface such that the additional reflecting surface reflects the light of the light source to the second reflecting surface, a portion of which is disposed at a rear side of the light source.

17. The optical device of claim 16, wherein when the first reflecting surface reflects the light from the light source and allows the light from the light source to enter the hologram recording member, the first reflecting surface allows the light from the light source reflected by the first reflecting surface to enter the rear side of the hologram recording member at an incident angle within a predetermined range that is the same as that used when the hologram image is recorded on the hologram recording member.

18. The optical device of claim 16, wherein when the first reflecting surface reflects the light from the light source and allows the light from the light source to enter the hologram recording member, the first reflecting surface allows the light from the light source reflected by the first reflecting surface to enter the rear side of the hologram recording member at an incident angle that is the same as an incident angle of a reference beam irradiated when the hologram image is recorded on the hologram recording member.

19. The optical device of claim 16, wherein:
   the light from the light source reflected by the second reflecting surface enters the hologram recording member at an incident angle different from that of the light from the light source reflected by the first reflecting surface, and
   the second reflecting surface is a curvilinear light reflector and is disposed behind the hologram recording member, where the second reflecting surface includes one end disposed at the rear end of the first reflecting surface and a second end disposed behind the light source.

* * * * *